United States Patent [19]

Hogenkamp

[11] Patent Number: 5,109,650
[45] Date of Patent: May 5, 1992

[54] METHOD FOR DISTRIBUTING PIECES OF CANDY TO PACKAGING MACHINES

[75] Inventor: Wilhelm Hogenkamp, Hanover, Fed. Rep. of Germany

[73] Assignee: Otto Hänsel GmbH, Hanover, Fed. Rep. of Germany

[21] Appl. No.: 560,123

[22] Filed: Jul. 30, 1990

[30] Foreign Application Priority Data

Jul. 31, 1989 [DE] Fed. Rep. of Germany ....... 3925272

[51] Int. Cl.⁵ .............................................. B65G 47/12
[52] U.S. Cl. ........................................ 53/443; 53/168; 198/347.1; 198/347.4; 198/369
[58] Field of Search ............... 198/347.1, 347.2, 347.3, 198/347.4, 358, 369; 53/443, 168

[56] References Cited

U.S. PATENT DOCUMENTS

| | | | |
|---|---|---|---|
| 2,497,874 | 2/1950 | Evans et al. | 198/369 X |
| 3,429,416 | 2/1969 | Provost et al. | 198/358 X |
| 3,648,820 | 3/1972 | Schafer et al. | 198/358 |
| 4,003,462 | 1/1977 | Perrott | 198/369 |
| 4,281,756 | 8/1981 | Bruno | 198/369 |
| 4,282,964 | 8/1981 | Hogenkamp et al. | 198/369 |
| 4,359,149 | 11/1982 | Erlichman et al. | 198/347.1 |
| 4,424,966 | 1/1984 | Chandhoke | 198/369 X |
| 4,618,341 | 10/1986 | Oldham et al. | 198/347.3 X |

*Primary Examiner*—Robert P. Olszewski
*Assistant Examiner*—Cheryl L. Gastineau
*Attorney, Agent, or Firm*—Max Fogiel

[57] ABSTRACT

A method of distributing articles (10), especially such pieces of candy as slabs and bars of chocolate, pralines, etc., that are constantly arriving in transverse rows on a continuous conveyor to several packaging machines (1), whereby the articles are transferred one row at a time by means of a shunt (5) to either an upstream or a downstream packaging machine, arrayed in a row on an outtake belt (7) upstream of each packaging machine, and packaged in each packaging machine. The articles are when necessary supplied to and temporarily stored one row at a time in a buffer (2) in the vicinity of one or more operational or non-operational packaging machines by way of another shunt (6) that is independent of the first shunt and in that, when the capacity of the buffers is exceeded, they are unloaded in sequence by supplying their contents to operational packaging machines.

11 Claims, 12 Drawing Sheets

METHOD FOR DISTRIBUTING PIECES OF CANDY TO PACKAGING MACHINES

BACKGROUND OF THE INVENTION

The invention concerns a method of distributing articles, especially such pieces of candy as slabs and bars of chocolate, pralines, etc., that are constantly arriving in transverse rows on a continuous conveyor to several packaging machines, whereby the articles are transferred one row at a time by means of a shunt to either an upstream or a downstream packaging machine, arrayed in a row on an outtake belt upstream of each packaging machine, and packaged in each packaging machine. The articles in question, particularly slabs of chocolate, are produced continuously in a manufacturing section and continuously supplied adjacent in transverse rows to the packaging section, which includes several machines. The total output of the packaging machines must be greater than that of the manufacturing section in order to create enough of a reserve output to ensure that the manufactured articles will continue being accommodated and packaged even during interruptions in processing, especially on the part of the packaging machines. Processing interruptions in the vicinity of the packaging machines are relatively frequent but necessitate relatively brief downtime. The different packaging machines must in fact be turned off almost regularly to allow regular replacement of the reels of packaging material and then readied again for operation. Processing interruptions can also occur in the vicinity of other systems, of the various belts and shunts for example in the event of undersized or broken slabs that should not be diverted to the packaging procedure, in which case appropriate detectors disengage the packaging machine or its associated shunt, etc. To compensate for these normal interruptions, which cannot be avoided, every packaging section is designed to operate with what is called a reserve output, meaning that the output of all the packaging machines is greater than that of the section that the pieces of candy are manufactured in. When all the packaging machines are operational, accordingly, it is possible either to keep one turned off to constitute a reserve output or to operate all at a reduced output.

The manufacturing section usually operates continuously, even during holidays and weekends. The packaging machines, however, must be turned off at such times because they require human supervision. The continuously manufactured articles must accordingly either be temporarily stored or will be rejected as excess upstream of the packaging section. Remelting such an excess and returning it to the manufacturing section is known. This approach, however, is impossible with filled candies. The only other possibility is to hire temporary help for the packaging section to keep the machines in continuous operation during weekends and holidays and handle the normal interruptions as they occur.

A method and packaging section of the aforesaid type is known from German Patent 2 831 323. Articles arrive constantly on a continuous conveyor. There is a shunt between the supply belt and the forwarding belt in the vicinity of each packaging machine. When it is in one state, the shunt leads to the forwarding belt and, when it is in the other state, to an outtake belt by way of other intermediate means of conveying. Since the outtake belt is at an angle of approximately 90° to the supply belt and forwarding belt, a continuous row of articles can be constructed from several transverse rows on the outtake belt, supplied to the packaging machine, and packaged. When the packaging machine or outtake belt associated with it is not operational, the shunt will remain in a state wherein it transfers the articles from the supply belt to the forwarding belt. At the end of the forwarding belt is the supply belt associated with another packaging machine, accompanied by another shunt and another forwarding belt. Several packaging machines can accordingly be distributed to branch off next to one another in a conveyor. The forwarding belt associated with the last packaging machine can lead to an overflow that diverts articles that cannot be accommodated by the packaging machines as a whole. One drawback to this system is that it has no intermediate-storage capacity. The only ways of preventing excess are to turn off the manufacturing section when the personnel are off or to replace them with temporary workers.

Increasing the size of the forwarding belt associated with the last packaging machine to create a capacity for storing a certain amount of articles on the belt is also known. The forwarding belt can then be reversed when the personnel return, all the packaging machines are operational, and the last packaging machine ensures a reserve output while accepting no articles from the manufacturing machine, allowing the last packaging machine to accept articles from the intermediate-storage belt and package them. What is a drawback here is the small intermediate-storage capacity, which, in conjunction with a high-output manufacturing section will in some situations allow manufacturing to continue for only about one minute at any rate.

A buffer that operates on the principle of a vertical-chain conveyor and has a comparatively large capacity downstream of a packaging section is accordingly also known. A tower houses chain-driven buckets that accommodate the articles. The chains travel over a system of pulleys that move independently, and various numbers of articles can accordingly be added to and taken from the buckets at the same time. A bucket can only be unloaded of course when an associated packaging machine is operational. The exit from the tower usually communicates with a device that returns the stored objects to the packaging section, where they can be conveyed to a reserve output of operational packaging machines. The drawback of towers of this type is that they can usually be unloaded only by way of the last packaging machine, which takes a long time. The towers also have a limited capacity because they contain considerable amounts of mass that must be moved and do not allow all of the arriving articles to be accommodated. A tower of this type is accordingly not appropriate for covering periods in which all the packaging machines are down.

Positioning a central buffer of this kind at the upstream end of the packaging section, between the manufacturing machine and the first packaging machine, instead of at its downstream end, downstream of the packaging machines, that is, has already been proposed. This approach, however, entails the drawback that all the articles being packaged must travel through the buffer even though all or some of the packaging machines are in themselves operational. Forwarding the articles through a buffer when unnecessary again entails a basic drawback in that, when they are added to the buckets and removed from the bottom of the buckets, the articles move along the surface that they are resting on. A relative motion of this type is a drawback in that the articles will crumble to some extent, and buffers that all of the articles must travel through accordingly get dirty fairly rapidly. When the articles are elongated, they tend to tilt while being added to or removed from the buffer, no longer remaining oriented along the direction of travel, and it often becomes necessary to reorient them downstream of the buffer before they can be supplied to the individual packaging machines. Furthermore, an upstream central buffer of this type can only be employed with manufacturing sections that operate relatively slowly. The considerable masses that must be moved around inside the buffer prevent it from being loaded and unloaded rapidly.

Associating several small buffers instead of a single large one with the individual packaging machines in a packaging section has accordingly been proposed. The system is designed such that the articles constantly arriving on the continuous conveyor will be distributed among the individual buffers by complicated mechanisms. Each buffer is associated with one packaging machine, which can only be supplied from its particular buffer. The drawback of a packaging section of this type is that when one of the buffers malfunctions, its packaging machine will no longer be supplied with articles even though it is in itself operational. A packaging machine that is not operational on the other hand, because of a reel change for example, can cause a backup in the buffer just upstream, making it necessary to turn off the manufacturing machine because the buffer is full.

SUMMARY OF THE INVENTION

The object of the present invention is to disclose a method and a packaging section that employs it that will allow constantly arriving articles to be supplied to packaging machines as directly as possible and to be packaged therein. If this procedure becomes impossible due to such operationally dictated interruptions as reel changing etc. at one or more of the packaging machines, the articles will be temporarily stored when necessary. During extensive interruptions, when for example all packaging machines are turned off while the personnel are off, the capacity of the buffer will be increased to allow the articles to continue to arrive, and the contents of the buffer will be packaged out once the personnel are back on the job. Turning off the manufacturing machines and the creation of an excess will at any rate be avoided whenever possible.

This object is attained in a method of the aforesaid type in accordance with the invention in that the articles are when necessary supplied to and temporarily stored one row at a time in a buffer in the vicinity of one or more operational or non-operational packaging machines by way of another shunt that is independent of the first shunt and in that, when the capacity of the buffers is exceeded, they are unloaded in sequence by supplying their contents to operational packaging machines. The invention accordingly represents an advance over the state of the art. There is no central buffer either downstream of the last packaging machine at the end of the distribution line or upstream of the first packaging machine at the beginning of the line. Nor is the distribution line divided into several buffers, each upstream of one packaging machine. There is on the other hand a single buffer in the vicinity of each packaging machine that can be loaded with articles whether or not its associated packaging machine is operational, and the articles will accordingly be temporarily stored in that buffer. Each individual buffer will accordingly be able to accommodate articles capable of association not only with its own packaging machine but with all the other packaging machines. It will be sufficient for each buffer to be capable of being unloaded only by its associated packaging machine. The system always operates with a redundancy of packaging machines, meaning that the total output of the packaging machines is greater than that of the manufacturing machines, and there will always be a reserve output. The reserve output can easily be smaller than a whole packaging machine. Four packaging machines can operate with a manufacturing machine that has an output equaling that of 3.3 packaging machines for example, resulting in a reserve output of 0.7 of the output of a single packaging machine. This ratio will be absolutely satisfactory because, in addition to the packaging machines, there are just as many buffers available, and they can be operated in parallel with one or more packaging machine or even alone when all the packaging machines are down, and will be capable of accommodating all the articles arriving from the manufacturing machines. It is important for the second shunt to operate independently of the first and specifically in the vicinity of each module of packaging machine and buffer, so that the packaging machine can be operated while the buffer is being loaded even in the vicinity of each module. The buffer will in this event substitute for a packaging machine. Although the individual buffers do not need to have all that much capacity, the number of buffers will in the final analysis ensure a relatively large total capacity, large enough to cover periods during which the packaging machines will be intentionally turned off. Such turnoffs will also be interpreted as "interruptions."

The new method has many advantages. Of primary is that most of the manufacturing machine's output, the arriving articles, that is, are directly packaged in the packaging machines, without traveling through a buffer, keeping the in-itself unavoidable soiling of the buffers within limits. The articles are stored only when absolutely necessary. The articles are stored in the buffers beginning with the emptiest, and the buffers are completely or incompletely unloaded beginning with the fullest. Since one buffer is associated with each packaging machine, the masses that have to be moved around within a single buffer are relatively smaller than those that have to be moved around within a central buffer, and the buffers can be operated at a constant article-arrival rate. The particular shunts employed, finally, are considerably simpler than the relatively complicated loading station described in German Patent 2 831 323. The simplicity of the shunts is also reflected by their high operating reliability and extremely low sensitivity to malfunction. Since the buffers can be loaded with articles from the distribution line independently of the packaging machines, a buffer with its associated shunt is exactly equivalent to a packaging machine with its shunt, at least with respect to total capacity and output. The basic design can be applied to a wide range of potential procedures. There is, in contrast to the prior art, no real problem when the output of the operational packaging machines is lower than the capacity of the manufacturing section. The arriving articles can easily be accommodated even when two or three packaging machines are down. It is also absolutely possible to disengage one buffer when it malfunctions or when it needs cleaning. It is accordingly possible to clean the individual buffers one after another at prescribed intervals and then reengage them without having to disrupt the operation of the manufacturing machine. Since the mass of the individual buffers is smaller than that of a central buffer, they can be operated more slowly, at the rate, that is, that the articles being packaged arrive at. Since both packaging and temporary storage can occur simultaneously at one module of packaging machine and buffer, another packaging machine, one that is not operational for example, can be replaced or relieved. Another advantage is that the packaging machine can be operated at various increments of output. Once an interruption has been cleared up, that is, the machine can initially be operated at ⅓ of its rated output, with the other ⅔ of the articles being added to the associated buffer, and then accelerated to ⅔ and finally to 3/3, which is the output of a rapidly operating packaging machine.

The buffers are loaded and/or unloaded in sequence and in graduations that correspond to a fraction of their capacity. The capacities of the buffers associated with the individual packaging machines are all equal. Each buffer is divided into individual graduations, four for example, and their load is monitored by determining for example that one buffer is more than ¼ full and another more than ¾ full etc. If the number of arriving articles exceeds the total potential output of the operational packaging machines, they must be temporarily stored. The storage proceeds, however, completely independently of what packaging machine is non-operational. What determines where the stored articles are stored, rather, is what buffer is emptiest. If several are equally full, the sequence will be indeterminate, corresponding for example to the distribution of buffers along the line. The reverse occurs in unloading. If the potential output of all the operational packaging machines exceeds the output of the manufacturing section by more than that of one machine, one buffer, usually the fullest, can be unloaded while the packaging continues. The unloading process, like the previously described loading process, will not be completed, totally emptying the buffer, that is, but an attempt will be made to keep the distribution of articles among the buffers as uniform as possible because what packaging machine, shunt, or buffer the next interruption will occur at cannot be predicted.

It is absolutely possible for one or more buffers to be loaded and unloaded simultaneously, even at different rates. This approach makes sense when for example the manufacturing section is turning out a complicated product, chocolate with whole nuts or with a complicated filling for example, and must be operated more slowly. The belts in the distribution line will then be traveling more slowly and, when the articles are being directly supplied to the packaging machines, the machines will also be operating at the same reduced speed even though rated at a higher output. If it becomes necessary to unload a buffer during this procedure, the unloading and the packaging in the associated machine can proceed at the same output, comparatively accelerated, that is. It may occur that an operational packaging machine is available while a perhaps very full buffer has to be unloaded. It is in this event possible to supply the machine with articles, which are basically supposed to be supplied directly to it, by way of the associated buffer and accordingly to add them to the buffer at a lower rate while removing them from it at full speed, at the same output as that of the packaging machine, that is. The buffer itself will eventually also become emptier due to the difference between the two speeds.

The packaging section that employs the method is characterized in that a buffer that temporarily stores the articles is associated with each packaging machine, in that there is another shunt for each packaging machine, and in that each buffer can be loaded through the second shunt and unloaded through the outtake belt. The result is a series of s consisting of a packaging machine, a buffer, two independent shunts, an outtake belt for the packaging machine, and an input belt and an outtake belt for the buffer. A loop is created in the vicinity of each packaging machine with the buffer included in it by way of its input belt, meaning that it can be loaded and unloaded into the packaging machine at the same time by way of its outtake belt. The packaging machine is permanently neither in parallel with nor in series with the buffer. The two independent shunts make it possible to switch back and forth between parallel and series. This considerably expands the range of modes that the packaging machines and buffers can be operated in, assuming that each distribution line has at least two and, to advantage, three to five modules. The separation of the shunts in the vicinity of each module simplifies their design and makes them relatively insensitive to malfunction. The design makes it possible to introduce the article preferably directly into the packaging machine as is requisite in all plants at the state of the art that have buffers upstream of their packaging machines. The total capacity of all the buffers can also be distributed uniformly among them, which entails the advantage that the masses to be moved within each individual buffer are smaller, so that they can be operated at the same rate as the articles on the continuous conveyor or distribution line. Another and even greater advantage is that several buffers can be loaded and/or unloaded at the same time.

Several modules, each comprising a packaging machine and a buffer are distributed along the distribution line, with the packaging machine in each module being supplied with articles independently of the other packaging machines directly through one shunt and/or indirectly from the buffer through another shunt. Each buffer accordingly practically substitutes for a packaging machine for a particular time when necessary. Since each buffer can easily be disengaged for cleaning for example for a particular time, the capacity of the remaining buffers will be sufficient to handle conventional interruptions. The overall buffer capacity can be high enough to cover periods when the packaging machines are down but the manufacturing machine continues to operate.

Each buffer in each module can be loaded through the second shunt by way of a buffer-input belt and unloaded into the packaging machine by way of a buffer-output belt and the outtake belt. The buffers can accordingly be operated independently of the packaging machines. It is absolutely possible for the buffer associated with the first packaging machine to accommodate the articles that would ordinarily be supplied to the third packaging machine for example.

The first shunt can be upstream of the second shunt along the distribution line in each separate module. The advantage is that, as soon as a packaging machine is operational, article can be supplied to it directly through the first shunt. Supplying the packaging machines directly is accordingly preferred. When on the other hand a packaging machine goes down, the first row of articles that it no longer accepts can be intercepted by its associated buffer. The opposite arrangement, with the second shunts upstream of the first shunts is in itself also possible.

Controls determine the operational status of each packaging machine and the operational status of and level of contents in each buffer and activate the shunts, buffers, and belts. The controls monitor and control the various components in as simple a way a possible.

The packaging machines and buffers can be turned off individually and independently for cleaning for example or for an intentionally longer period.

The two shunts can be designed and positioned variously. Depending on the application, they can swing up or down. A combination is also readily conceivable. Both the packaging machines and the buffers can be on the same side of the distribution line or on opposite sides. All that is important is to ensure that each buffer can be connected again to the outtake belt associated with a packaging machine.

BRIEF DESCRIPTION OF THE DRAWINGS

Preferred embodiments of the invention will now be described in greater detail with reference to the drawings, wherein.

DESCRIPTION OF THE PREFERRED EMBODIMENTS

Figure 1:
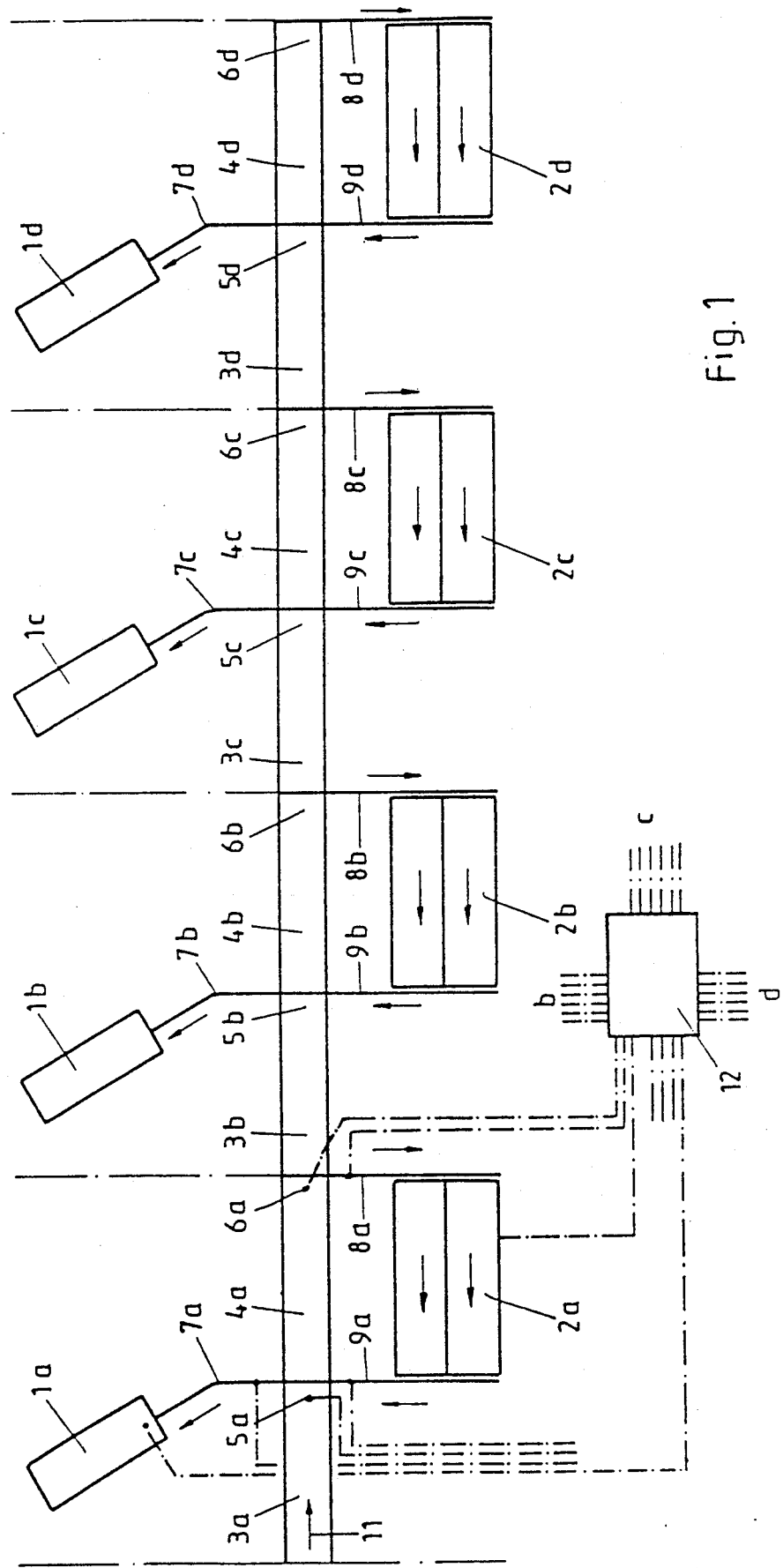
FIG. 1 is a schematic representation of one embodiment of a packaging section.
Figure 4:
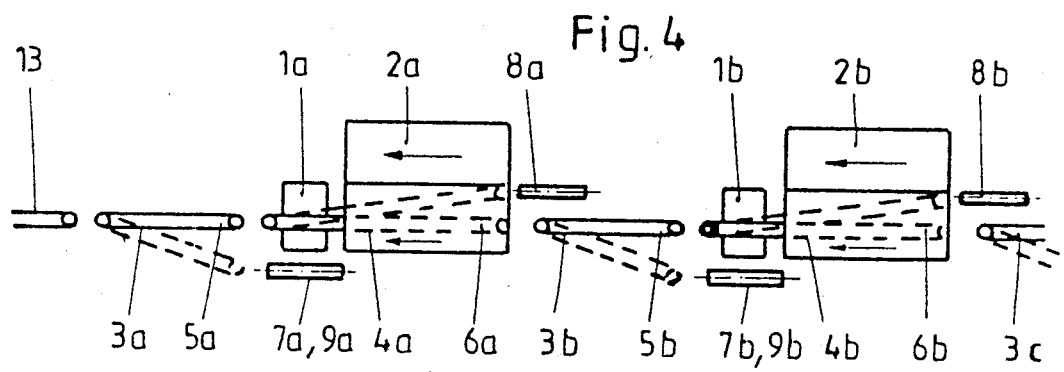
FIG. 4 is a schematic side view of the packaging section in FIG. 1.
Figure 5:
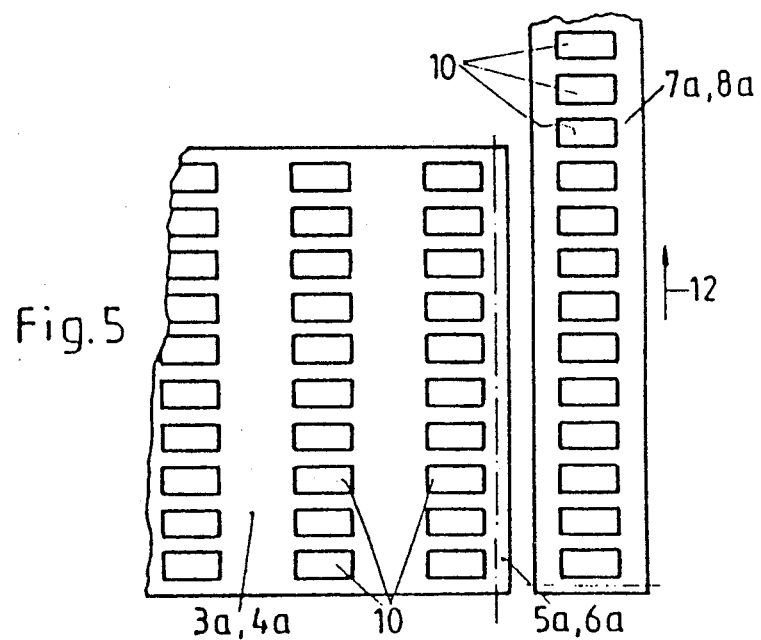
FIG. 5 is a top view of a transfer point between a shunt and an outtake belt.

FIG. 1 is a top view of four packaging machines $1a$, $1b$, $1c$, and $1d$. Associated with each machine is a buffer $2a$, $2b$, $2c$, or $2d$. A distribution line comprises several adjacent belts. The articles 10 (FIG. 5) being packaged come in the direction represented by arrow 11 (FIG. 1) on an unillustrated continuous belt from a manufacturing machine that is also unillustrated, originally arriving at a supply belt $3a$ and then, with no adjustment to the system, at a forwarding belt $4a$, again at supply belt $3b$ and forwarding belt $4b$, etc. Articles 10 can accordingly travel through the whole distribution line consisting of belts $3a$ to $4d$ in one direction. Each supply belt $3a$, $3b$, $3c$, or $3d$ also either constitutes a shunt $5a$, $5b$, $5c$, or $5d$ or consists of a series of ancillary belts with the shunt at the end. Forwarding belts 4 are similar. They can either simultaneously constitute another shunt $6a$, $6b$, $6c$, or $6d$ or have such a shunt at the end. An outtake belt $7a$ leads from first shunt $5a$ to first packaging machine $1a$. This situation is shown from the top in FIG. 5. It will be evident that first shunt $5a$ will transfer articles 10, which arrive adjacent in transverse rows, to outtake belt $7a$, which advances discontinuously, creating out of the transverse rows on outtake belt $7a$ a continuous row that extends in the direction represented by arrow 12. FIG. 4 illustrates how supply belt $3a$ has access to the outtake belt $7a$ that leads to packaging machine $1a$ when first shunt $5a$ is in the position indicated by the broken lines. If on the other hand, first shunt $5a$ is not down, the transverse rows of articles 10 will be transferred to forwarding belt $4a$ and will arrive in the vicinity of second shunt $6a$. While second shunt $6a$ is disengaged, the articles will arrive on the belt $3b$ that supplies next module b. It will already be apparent that several equal modules a, b, c, and d are distributed along the distribution line. All the modules are identical in design, and what has been said with respect to module a also applies to the others. Once second shunt $6a$ has been activated on the other hand, shifted into the position illustrated in FIG. 4, that is, which can be either above or below the plane of the distribution line, like the first shunt $5a$ in FIG. 4 by way of example, depending on how the system is designed, the articles will arrive on a buffer-input belt $8a$ (FIGS. 1 and 5) and will be loaded into buffer $2a$. The buffer is unloaded by a buffer-output belt $9a$ that has direct access straight to outtake belt $7a$, so that articles 10 can be unloaded from buffer $2a$ and supplied to packaging machine $1a$ only by way of buffer-output belt $9a$ and outtake belt $7a$. This basic design and distribution is identical between the packaging machines and buffers in the vicinity of each module a, b, c, and d. The embodiment described and illustrated by way of example herein employs four modules a, b, c, and d. The smallest sensible number of modules would be two. Otherwise there may be as many as desired, depending on the potential output of the manufacturing machine. The various arrows in FIG. 1 represent the various possible directions that articles 10 can move in without in any way implying that all the packaging machines $1a$, $1b$, $1c$, and $1d$ have to operate simultaneously. Only some of the modules in fact will be operating at once, as will be explained hereinafter.

Figure 2:
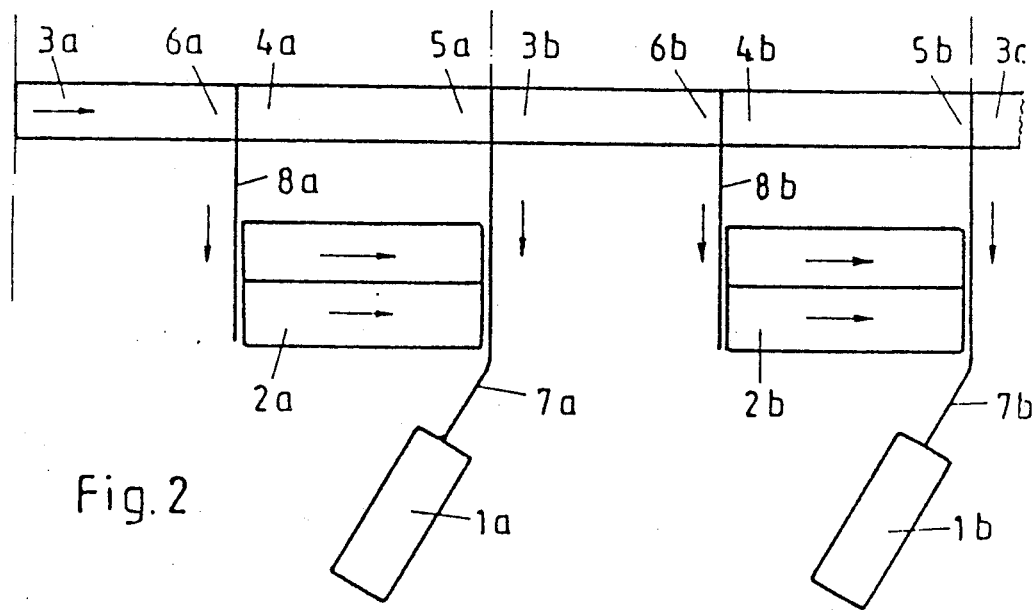
FIG. 2 is a schematic representation of another embodiment of a packaging section.

One set of controls 12 governs all units a, b, c, and d. Extending out of the controls are a number of electric lines that lead to (unillustrated) sensors or monitors in the vicinity of the modules and allow them to be monitored and controlled. All electric lines are represented by dot-and-dash lines. One electric line for example extends from controls 12 to packaging machine $1a$. This line informs controls 12 that packaging machine $1a$ is operational and allows the controls to turn the machine on and off. Another line leads to outtake belt $7a$ and a third to first shunt $5a$. Other lines lead to second shunt $6a$, to buffer-input belt $8a$, to buffer $2a$, and to buffer-output belt $9a$. The level of contents of buffer $2a$ is accordingly monitored and communicated to and entered into controls 12, allowing them to determine at any time whether and to what extent the particular buffer is loaded with articles 10. Buffers $2a$, $2b$, $2c$, and $2d$ are divided into equal graduations, four in each for example, so that the buffer will be 25% full once the first graduation has been attained. The same is true of the other modules, b, c, and d. Only the initial section of the corresponding lines, which also extend from overall controls 12, are, for simplicity's sake, illustrated. Although the first shunt 5 is always upstream of second shunt 6 in each module a, b, c, and d in the embodiment illustrated in FIG. 1, the sequence is reversed in the packaging section illustrated in FIG. 2, with each second shunt 6 upstream of first shunt 5. Second shunt 6 is in other words at the end of supply belt 3, and buffer-input belt 8 logically also has access to the same shunt with outtake belt 7, which leads to packaging machine 1, branching off from first shunt 5. In contrast to FIG. 1, which illustrates an embodiment wherein packaging machines $1a$ through $1d$ are on one side of belts $3a$ through 4d and buffers 2a through 2d are on the other side, FIG. 2 illustrates that it is also possible to locate packaging machines 1 and buffers 2 on the same side of the distribution line. Although FIG. 1 illustrates only modules a and b and the first part of module c, the concept of a series of several will be obvious.

Figure 3:
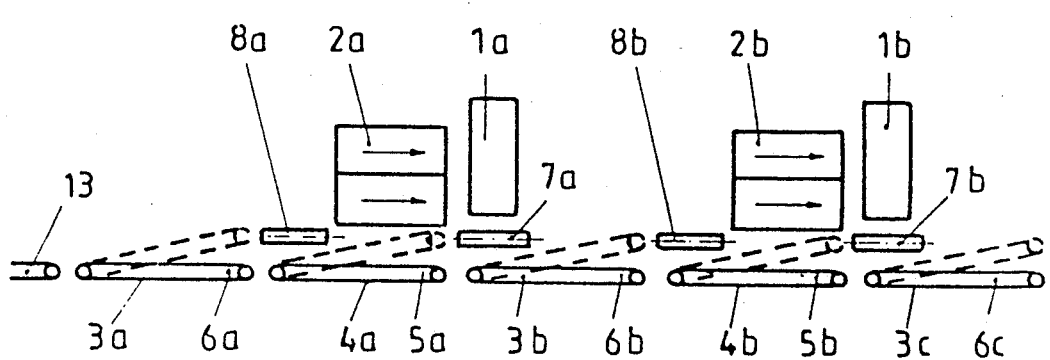
FIG. 3 is a schematic side view of the packaging section in FIG. 2.

FIG. 3 is associated with FIG. 2, and FIG. 4 is a side view of all or part of the embodiment illustrated in FIG. 1. It will be evident from FIG. 4 that all shunts 5a and 5b, 6a and 6b, etc. can be raised, all can be lowered, or some can be raised and the rest lowered to activate them. The particular mode makes no difference in principle, and all that is important is that each packaging machine 1 always be directly attainable by way of an outtake belt 7 while each buffer-input belt 8 and hence each buffer 2 has access by way of a second shunt 6 with a buffer-output belt 9 that in turn has access to the same outtake belt 7. A separate buffer-output belt 9 can be eliminated from the embodiment illustrated in FIG. 2 if the outtake belt 7 downstream of first shunt 5 also travels past the exit from buffer 2.

It will be evident that, when articles 10 are transferred from a supply belt 3 to a forwarding belt 4 or vice versa, the articles will not tend to slide along the belt. The various belts are aligned at this point and are all powered, specifically by the mechanism that operates a continuous conveyor 13 (FIGS. 3 and 4), on which the transverse rows of articles 10 coming from the manufacturing machine enter the packaging section, where they are transferred to first supply belt 3a. Once articles 10 have been transferred to an outtake belt 7, a buffer-input belt 8, or a buffer-output belt 9, one the other hand, they will be traveling in the opposite direction, because the belts meet at a right angle (cf. FIG. 5), and will slide over the belts to a certain extent. Obviously, therefore, certain retainers must be provided, although they are not, for simplicity's sake, illustrated. Each sliding motion is disadvantageous of course in that it entails the risk of rubbing off fragments from the articles that can lead to contamination or malfunction. It is accordingly sensible to allow such a sliding motion, which will obviously occur frequently in the vicinity of a buffer, to occur if at all possible only once, while articles 10 are being directly transferred to packaging machine 1. A motion of this type is also unavoidable while articles 10 are entering buffer 2, which is usually provided with buckets, intake baffles, or similar structures. The buffers become clogged, and it is accordingly recommended to store articles in them only when absolutely necessary, when, that is, the packaging machine's output is inadequate to the particular mode of operation or when it does not come up to the output of the manufacturing section.

How the packaging section illustrated in FIGS. 1 and 4 operates and is controlled will now be described in greater detail with reference to FIGS. 6 through 14.

Figure 6:
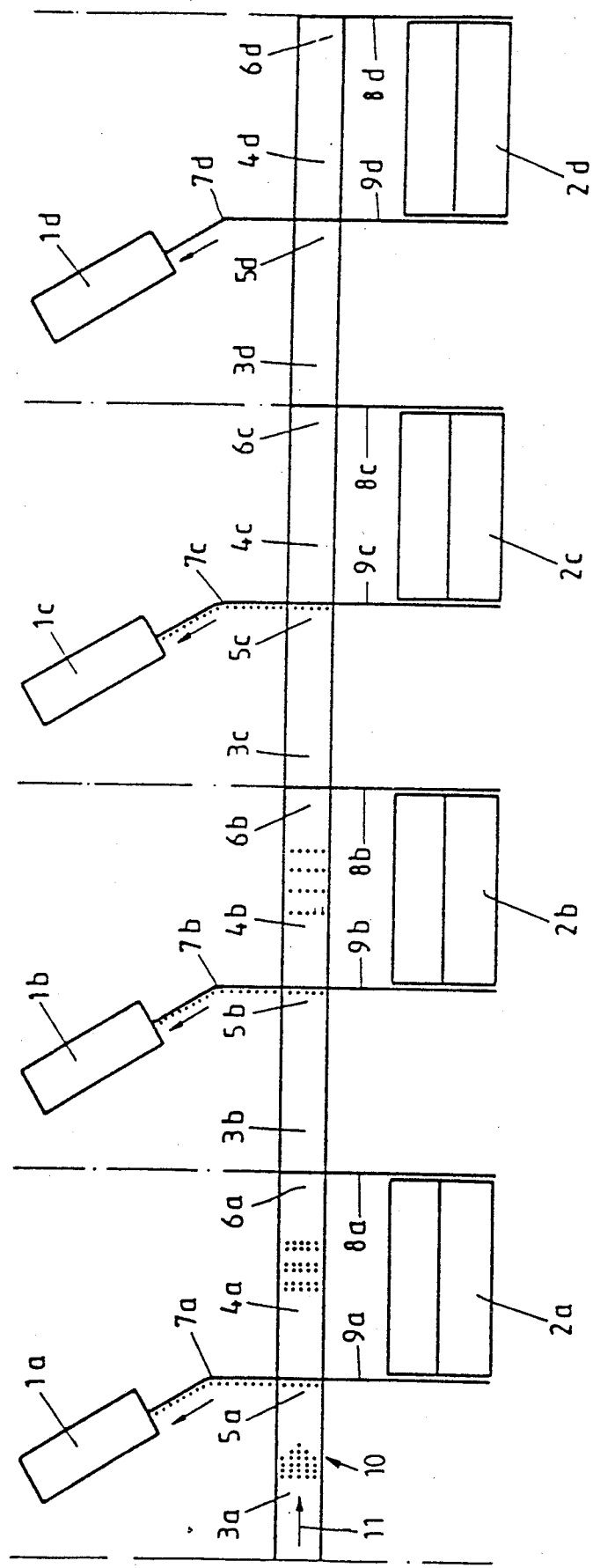
FIGS. 6 through 14 illustrate the packaging section illustrated in FIG. 1 at various stages of operation.

FIG. 6 represents the situation at the commencement of processing. All buffers 2 are empty and all packaging machines 1 are operational, meaning that they are correctly loaded with packaging material and are ready to work. This situation is communicated to controls 12. Articles 10 accordingly travel from the manufacturing machine on conveyor 13 to first supply belt 3a. The articles are represented by dots, and it will be evident that they are distributed equidistant in equidistant transverse rows. The controls now start packaging machine 1a and activate first shunt 5a, transferring a row of articles to outtake belt 7a. Since supply belt 3a also has access to forwarding belt 4a, the two next rows of articles will be transferred to it. Every third row will in this way be transferred to outtake belt 7a, which advances discontinuously and accordingly constantly supplies articles 10 to packaging machine 1a, which packages them in sequence. As will be evident from the dots, all the first rows are missing on forwarding belt 4a. At the second module, second packaging machine 1b is turned on and activated, leaving only the third rows on forwarding belt 4b to be transmitted to packaging machine 1c. Each packaging machine 1a, 1b, and 1c accordingly receives a third of articles 10, and none is left over for reserve machine 1d. All articles 10 are accordingly conveyed directly to packaging machines 1a, 1b, and 1c, without being intermediately stored and without being detoured through buffers 2. It is for example absolutely possible to process transverse rows of 18 articles each, advancing continuously along the distribution line at a rate of 120 rows a minute. Each machine 1a, 1b, and 1c will accordingly pack 40 rows a minute. It will be immediately apparent that, when a packaging machine 1a, 1b, or 1c goes down, the corresponding third of articles 10 can be diverted to the operational packaging machine 1d without storing any in buffers 2. It is accordingly possible to replace an empty reel of packaging material in a packaging machine when necessary or to remove damaged articles from it and clean it.

Figure 7:
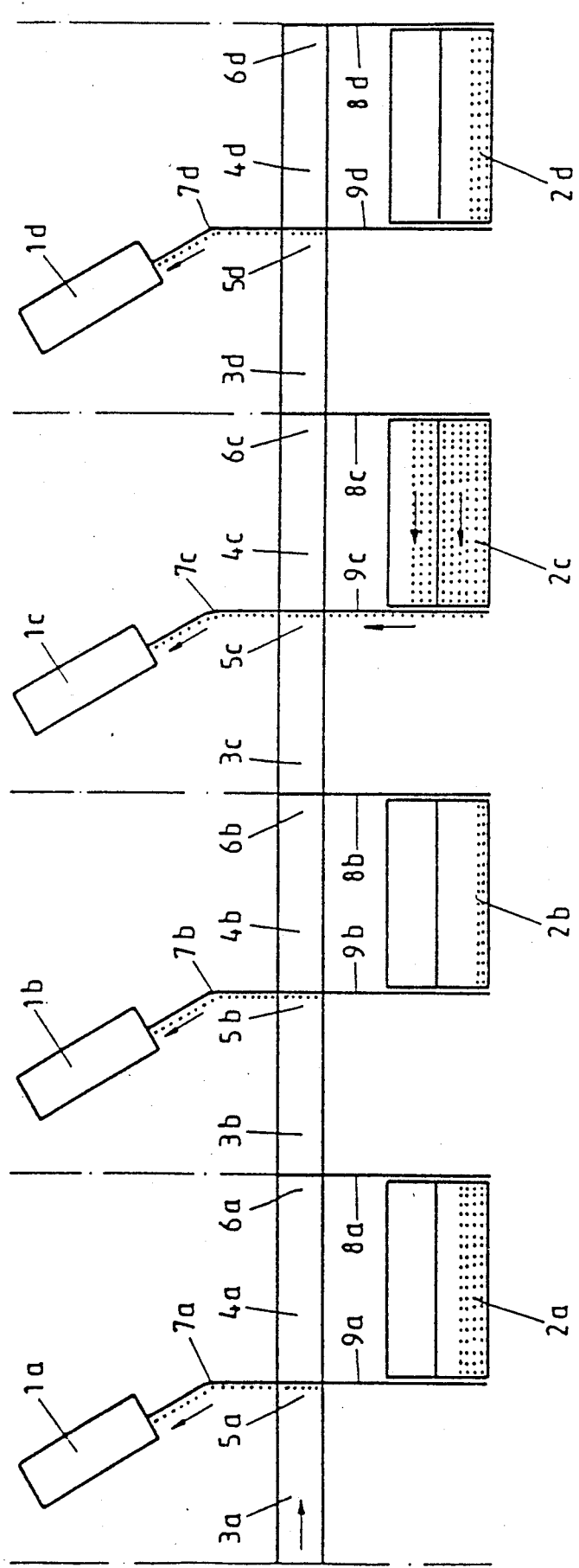

Obviously, however, more than one packaging machine may become non-operational simultaneously. In this case the article will have to be stored temporarily in buffers 2. FIG. 7 illustrates how buffers 2a, 2b, and 2c can be loaded to different levels, with buffer 2c for example being fullest. FIG. 7 accordingly represents the situation in which all packaging machines 1a through 1d are operational. All the machines are operating, and the articles 10 arriving from the manufacturing machine are directly distributed among machines 1a, 1b, and 1d, whereas fullest buffer 2c is simultaneously being unloaded, with the articles removed therefrom being supplied to packaging machine 1c by way of buffer-output belt 9c and its associated outtake belt 7c. This procedure is governed by controls 12. It can easily occur that buffer 2c is unloaded to the extent that it contains fewer articles than buffer 2a for example does. When this situation occurs, packaging machines 1a and 1c are reversed, and the articles that were being transferred directly to packaging machine 1a for packaging are now transferred to packaging machine 1c, while buffer 2a is unloaded to packaging machine 1a. The buffers are accordingly classified with respect to how full they are, and the different classes are constantly being compared, keeping the levels in all the buffers as identical as possible. Obviously, what has been described with respect to module c by way of example can also occur for any other module a, b, or d, in which case the same conditions will be valid.

Figure 8:
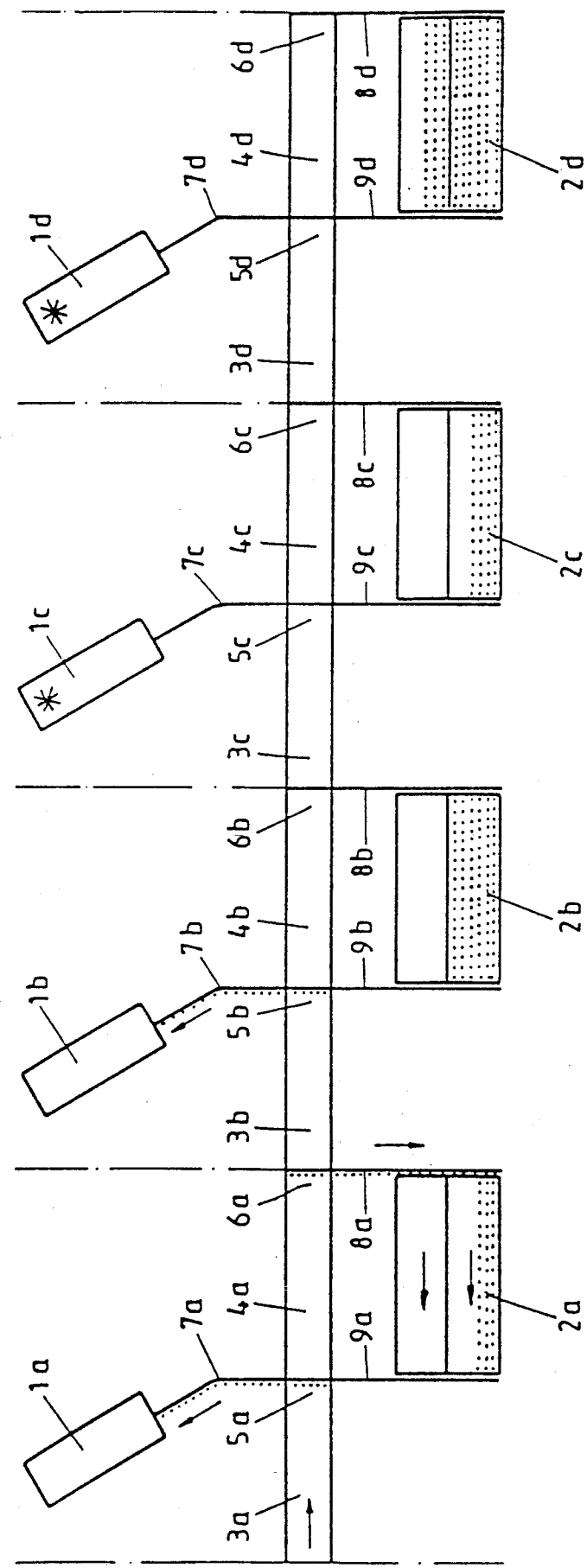

FIG. 8 illustrates a situation that might occur if two packaging machines, 1c and 1d for example, are down, as indicated by asterisks. Since the two machines are non-operational, accordingly, articles 10 will be directly packaged a third at a time in packaging machines 1a and 1b. Buffers 2a through 2b, however, are all also ready to accept articles, with buffer 2a being the emptiest at this particular instant. Controls 12 will accordingly activate buffer 2a, and the third 1/s will be loaded into it by way of second shunt 6a and buffer-input belt 8a. Buffer-output belt 9a is not moving. Buffer 2 will continue accepting articles until the next level is reached, when it is 50% full. At this instant the controls will compare the contents of the buffers and detect that buffer $2c$ is the emptiest. The controls will, assuming that packaging machines $1c$ and $1d$ are still down, switch from buffer $2a$ to buffer $2c$.

Figure 9:
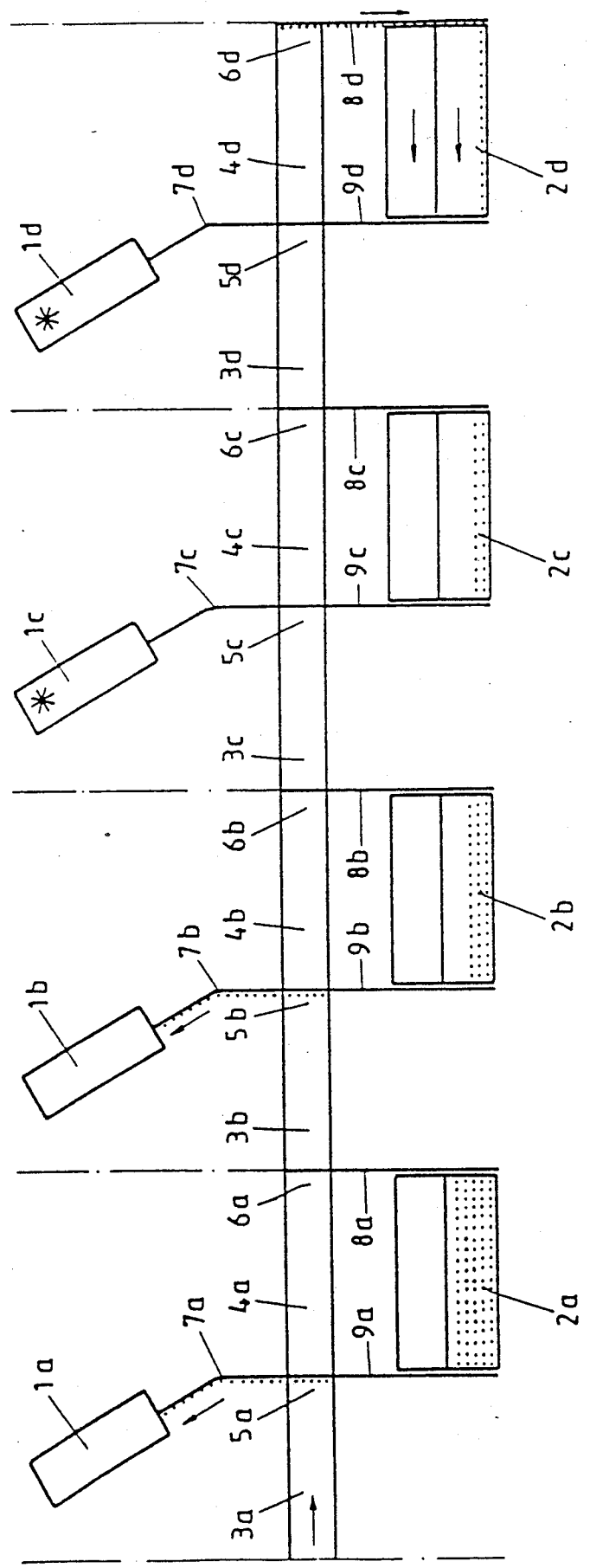

FIG. 9 illustrates a situation wherein packaging machines $1c$ and $1d$ are down. Packaging machines $1a$ and $1b$ will each accept ⅜ of the arriving articles, with the third ⅜ loaded into the emptiest buffer. It will be apparent that controls 12 distribute the rows automatically and will in particular control the equipment even when no new malfunctions occur. Switching will of course occur immediately when a previously down packaging machine indicates that it is operational again. Direct packaging, without intermediate storage, that is, will proceed in any event. At least this mode of operation is possible.

Figure 10:
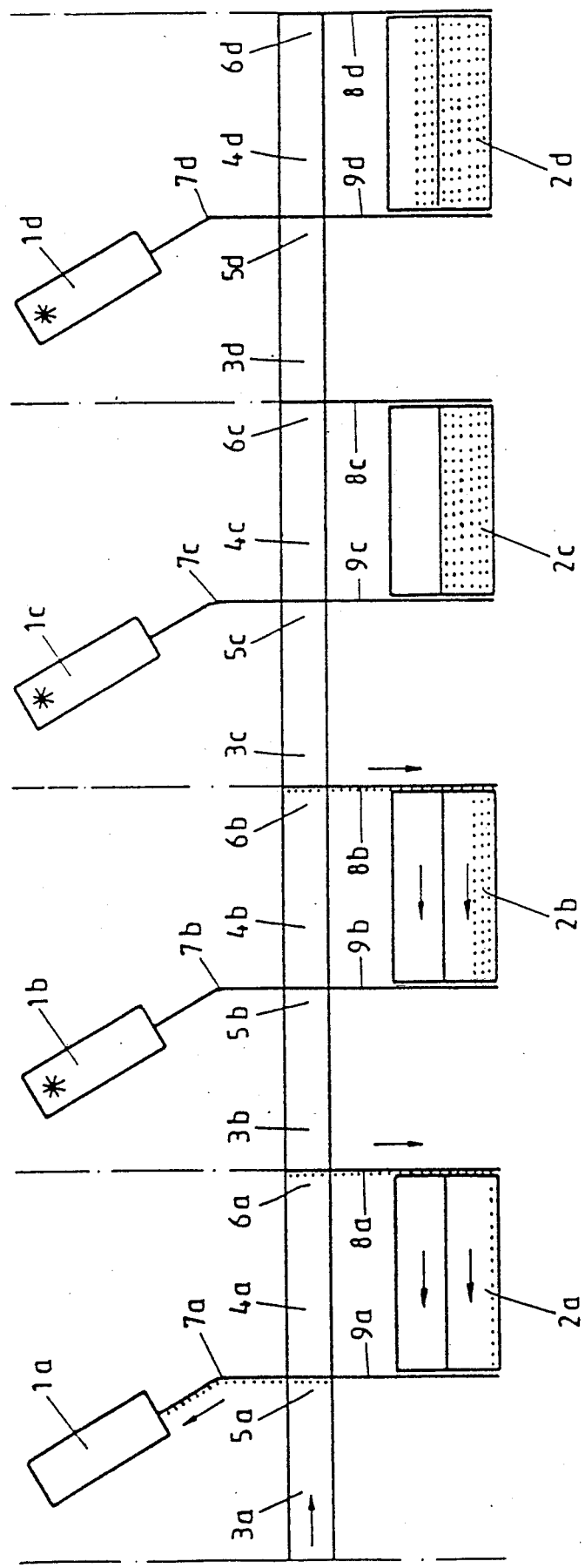

FIG. 10 illustrates a situation wherein the three packaging machines $1b$, $1c$, and $1d$ are down and only packaging machine $1a$ is operational. The state-of-the-art packaging sections are so severely affected by a malfunction of this extent that the manufacturing machine has to be turned off. This is not the case in accordance with the present invention, however, as will be immediately evident. FIG. 10 shows that ⅜ of the arriving article can be accommodated by packaging machine $1a$ and ⅜ must be temporarily stored, for which purpose controls 12 activate the two emptiest buffers, $2a$ and $2b$ in the present case. As soon as buffer $2b$ has more articles 10 at the level in question than buffer $2c$ does, the controls will disengage buffer $2b$ and engage buffer $2c$.

Figure 11:
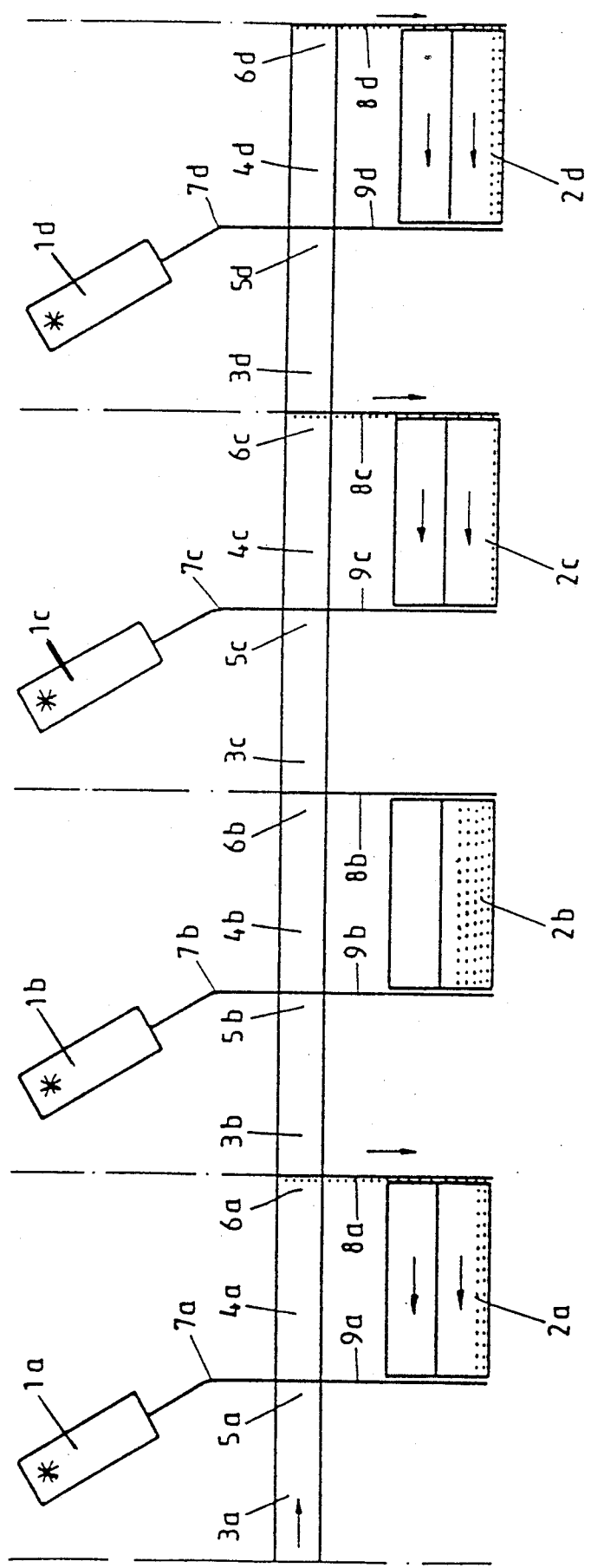

FIG. 11 illustrates the situation wherein all packaging machines $1a$ through $1d$ are down, which can occur for example during holidays. Although the manufacturing machine continues to operate in the absence of personnel, the packaging machines must all be turned off. The arriving articles are accordingly distributed among buffers $2a$, $2c$, and $2d$, the emptiest ones, that is. It will be obvious from the previously described examples that each buffer can accept 40 rows a minute and can accordingly only be operated at the same speed as the distribution line.

Figure 12:
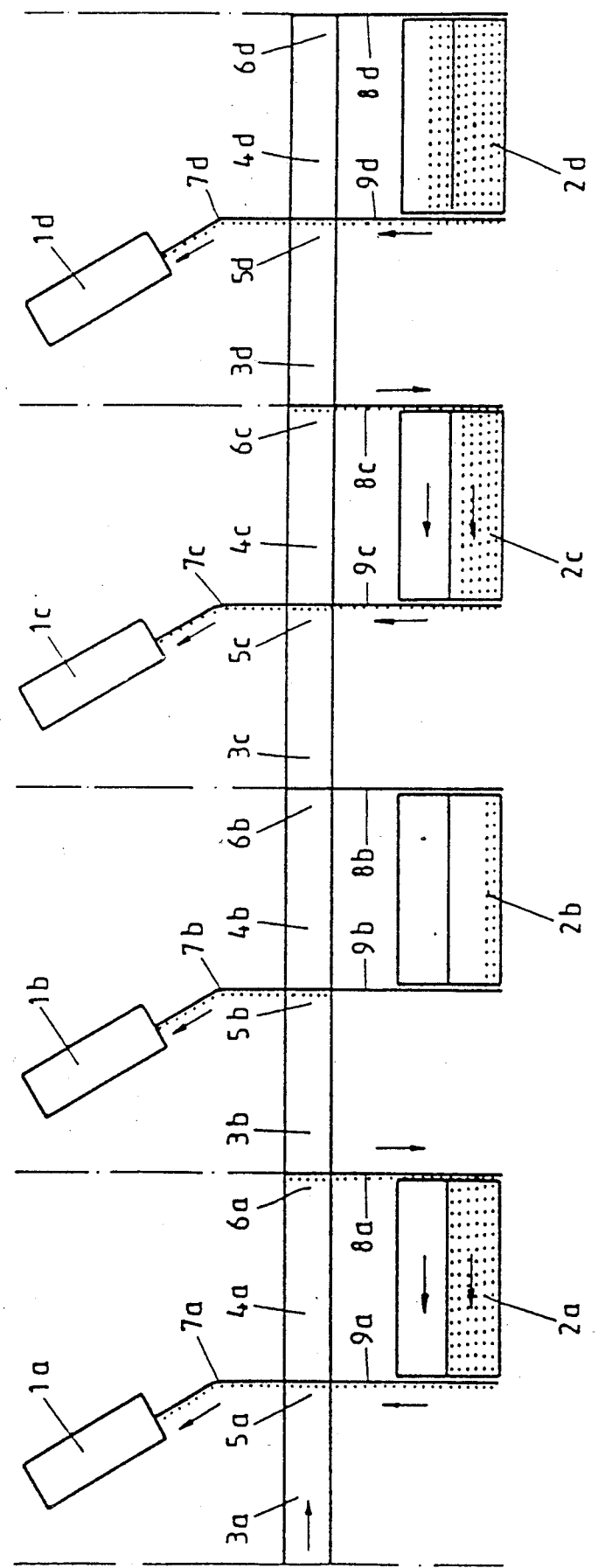

FIG. 12 illustrates the situation that occurs when the machinery is started up again after a holiday or weekend. It is simultaneously assumed that a difficult product is being manufactured and that the manufacturing machine will accordingly be operating more slowly. Assume that only 100 rows a minute are arriving instead of the aforesaid 120 rows. Packaging machines $1a$ through $1d$, however, are still perfectly capable of accepting and packaging 40 rows a minute. In this case, ⅜ of the arriving articles, 33⅜ rows a minute, that is, will be transferred directly to packaging machine $1b$. The second ⅜ will be loaded into buffer $2a$ at a rate of 33⅜ rows a minute. The third ⅜ will be loaded into buffer $2c$ at the same rate. Articles 10 will simultaneously be unloaded from buffers $2a$, $2c$, and $2d$ into their associated packaging machines $1a$, $1c$, and $1d$, and specifically at the higher speed of 40 rows a minute that the packaging machines are operated at. It will be evident that this mode of operation, loading at 33⅜ rows a minute and unloading at a higher rate, 40 rows a minute for example, will reduce the contents of buffers $2a$, $2c$, and $2d$, providing space in the buffers that can be utilized in the event of additional malfunctions and interruptions. If such do not occur, the controls will switch step by step to the direct-packaging mode illustrated in FIG. 6. Although the buffers in the figures have two graduations and can accordingly be loaded at two levels, they can of course be graduated in any way desired. A division into 4/4, with four levels per buffer is absolutely reasonable and sufficient.

Figure 13:
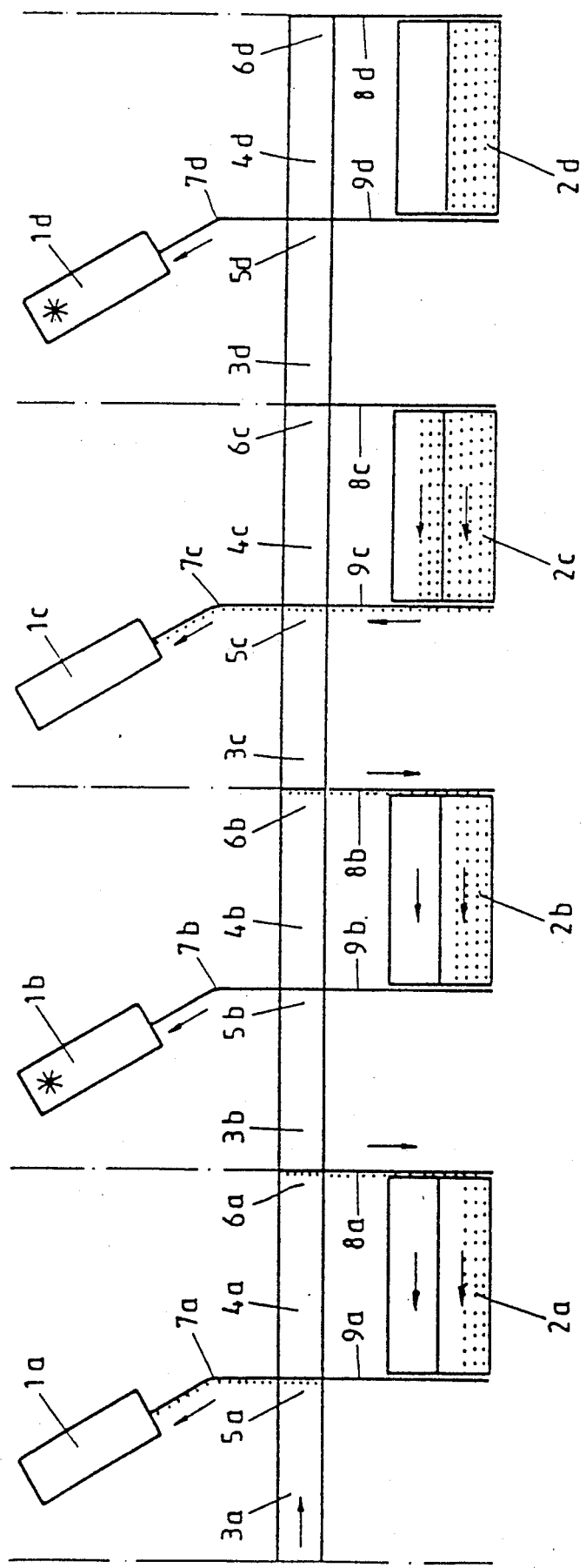

FIG. 13 illustrates another mode of operation with a lower manufacturing output of 100 rows a minute for example. Assume that packaging machines $1b$ and $1c$ are down. The articles are distributed ⅜ each to packaging machine $1a$ and buffers $2a$ and $2b$. The rate at these three components is 33⅜ rows a minute. Buffer $2c$ is the fullest and is accordingly being emptied at a higher rate of 40 rows a minute, with the articles being packaged in packaging machine $1c$.

Figure 14:
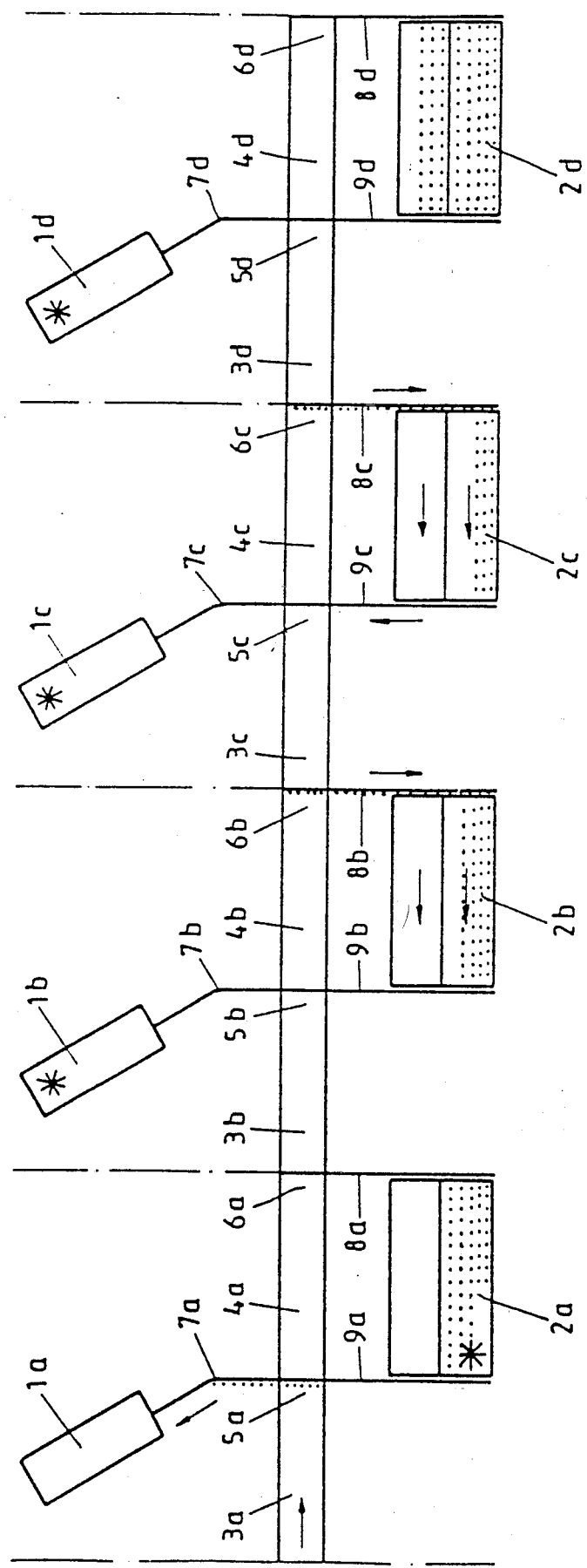

FIG. 14, finally, illustrates another type of malfunction, with, say, packaging machines $1b$, $1c$, and $1d$ down or non-operational. ⅜ of the articles are being packed directly by packaging machine $1a$. The other two thirds are being loaded into the emptiest buffers $8b$ and $8c$. Assume that buffer $2a$ is also down, being either repaired or routinely cleaned. Access to buffer $2a$ is accordingly blocked and controls 12 will only be able to compare buffers $2b$, $2c$, and $2d$. Once buffer $2a$ has been cleaned or repaired, it will indicate that it is operational again, at which point another buffer can be serviced.

I claim:

1. A method for distributing pieces of candy arriving constantly in transverse rows on a continuous conveyor to a plurality of packaging machines, comprising the steps: arraying said pieces of candy on a belt upstream of said packaging machines; transferring said pieces of candy one row at a time selectively through a first shunt to either an upstream or a downstream packaging machine or selectively supplying said pieces of candy to buffers at predetermined times and storing temporarily the supplied pieces of candy in said buffers one row at a time adjacent at least one packaging machine through a second shunt independent of said first shunt; unloading said buffers in sequence by supplying contents of said buffers to predetermined packaging machines; and packaging said pieces of candy in said packaging machines.

2. A method as defined in claim 1, wherein said buffers are loaded and unloaded in sequence and in amounts corresponding to a fraction of the capacity of said buffers.

3. A method as defined in claim 1, wherein at least one of said buffers is loaded and unloaded simultaneously.

4. A method as defined in claim 3, wherein said at least one buffer is loaded and unloaded simultaneously and at different rates of loading and unloading.

5. An arrangement for distributing pieces of candy arriving constantly in transverse rows on a continuous conveyor to a plurality of packaging machines, comprising: means for transferring said pieces of candy one row at a time through a first shunt to either an upstream or a downstream packaging machine; means for arraying said pieces of candy on an outtake belt upstream of said packaging machines; means for packaging said pieces of candy in said packaging machines; means for supplying said pieces of candy to buffers at predetermined times and storing temporarily the supplied pieces of candy in said buffers one row at a time adjacent at least one packaging machine through a second shunt independent of said first shunt; means for unloading said buffers in sequence by supplying contents of said buffers to predetermined packaging machines; said packaging machines being distributed along a distribution line; said pieces of candy being supplied for packaging one-by-one and parallel to transverse by said outtake belt; said supplying means comprising a supply module having a supply belt and a forwarding belt, said first shunt being located between said supply belt and said forwarding belt; said first shunt leading to said outtake belt, an outtake belt being associated with each packaging machine; each of said buffers being loadable through said second shunt and unloadable through said outtake belt.

6. An arrangement as defined in claim 5, wherein each packaging machine comprises a module; said packaging machines and said buffers being distributed along said distribution line, each packaging machine being supplied with pieces of candy independently of other packaging machines directly through said first shunt, said packaging machine being suppliable with candy pieces also indirectly from a buffer through said second shunt.

7. An arrangement as defined in claim 5, including a buffer-input and a buffer-output belt for each buffer, each buffer being loadable through said second shunt by said buffer-input belt, each buffer being unloadable into a respective packaging machine by said buffer-output belt and said outtake belt.

8. An arrangement as defined in claim 5, wherein said first shunt is located upstream of said second shunt along said distribution line.

9. An arrangement as defined in claim 5, including control means for determining operational status of each packaging machine and operational status of each buffer as well as level of contents in each buffer, said control means actuating said shunts, buffer, and belts.

10. An arrangement as defined in claim 5, including means for switching off said packaging machines and said buffers individually and independently for a predetermined time interval.

11. An arrangement as defined in claim 5, wherein said first shunt and said second shunt are pivotable up or down.

* * * * *